(12) United States Patent
Lee et al.

(10) Patent No.: US 7,114,780 B1
(45) Date of Patent: Oct. 3, 2006

(54) HEADREST WITH ADJUSTABLE CONNECTING TUBES

(75) Inventors: Mark Lee, Taoyuan (TW); Jung-Chang Wu, Bade (TW); Wei-Yu Wu, Taoyuan (TW)

(73) Assignee: Sysgration Inc., Taipei (TW)

( * ) Notice: Subject to any disclaimer, the term of this patent is extended or adjusted under 35 U.S.C. 154(b) by 0 days.

(21) Appl. No.: 11/307,483

(22) Filed: Feb. 9, 2006

(51) Int. Cl.
*A47C 7/72* (2006.01)
(52) U.S. Cl. .................................. 297/406; 297/217.4
(58) Field of Classification Search .............. 297/406, 297/407, 410, 440.14, 217.3, 217.4
See application file for complete search history.

(56) References Cited

U.S. PATENT DOCUMENTS

| | | | |
|---|---|---|---|
| 5,108,150 A * | 4/1992 | Stas et al. | 297/397 |
| 6,022,078 A * | 2/2000 | Chang | 297/391 |
| 6,406,334 B1 * | 6/2002 | Chu | 439/668 |
| 2005/0110313 A1 * | 5/2005 | Vitito et al. | 297/217.3 |

* cited by examiner

*Primary Examiner*—Milton Nelson, Jr.
(74) *Attorney, Agent, or Firm*—PAI Patent & Trademark Law Firm; Chao-Chang David Pai

(57) ABSTRACT

An improved headrest with adjustable connecting tubes is disclosed. The improved headrest comprises a main body, two connecting tubes, a socket unit and several pairs of intermediate connecting tubes. A plurality of threaded insertion holes are provided on the lower side of the main body, and the two connecting tubes may be inserted into these holes. The threaded insertion holes are spaced apart. The rectangular holes allow the adjustment in the distance between the two connecting tubes. The intermediate connecting tubes have several different diameters so that the intermediate connecting tubes may be connected with the bolts provided on the backrests of a seat for different models of automobiles. Hence, by adjusting the distance between the connecting tubes and selecting intermediate connecting tubes with a suitable diameter, the main body may be connected to the backrest of a seat for different models and makes of automobiles.

4 Claims, 2 Drawing Sheets

HEADREST WITH ADJUSTABLE CONNECTING TUBES

BACKGROUND OF THE INVENTION

1. Field of the Invention

The invention generally relates to an improved headrest with adjustable connecting tubes. More particularly, the invention relates to an improved headrest in which the distance between its two connecting tubes is adjustable and several pairs of intermediate connecting tubes with different diameters are provided so as to enable the headrest to be used for seats of different models and makes of automobiles.

2. Description of the Prior Art

With the progress of automobile technology, consumers regard comfort an important factor and automakers have tried to meet this need.

The seat of an automobile typically includes a sitting portion, a backrest and a headrest provided above the backrest. Such headrest allows a driver or a passenger to rest his head on it when the automobile is in motion or not in motion. Hence, if a suitable headrest can be provided, the level of comfort may be enhanced. However, because people have different heights and physiques, a single headrest can not meet the needs of people.

In addition, a small storage cabinet may be provided inside of the headrest so that personal items may be stored in such a cabinet. Furthermore, an electric device (such as a video device or an audio device) may be fitted in the headrest so that people sitting behind it may use such a device.

A better headrest would be the one that can be fitted on the seats of most models and makes of automobiles. In the prior art, a headrest that can be fitted on the seat of a model or a make of automobile often can not be fitted on the seat of another model or make due to the differences in the distance between the connecting bolts of a seat and in the diameter of the bolts. Hence, such differences result in an increase in the manufacturing cost of headrests.

To eliminate these disadvantages, the inventor put a lot of effort in the subject and has successfully come up with the improved headrest of the present invention that can be used for different models and makes of automobiles.

SUMMARY OF THE INVENTION

An object of the present invention is to provide an improved headrest that can be used for different models and makes of automobiles so that the manufacturing cost of headrests may be reduced.

Another object of the present invention is to provide an improved headrest that may be fitted on a seat easily by adjusting the distance between the connecting tubes and selecting the intermediate connecting tubes with a suitable diameter.

An improved headrest with adjustable connecting tubes is disclosed. The improved headrest of the present invention comprises a main body, two connecting tubes, a socket unit and several pairs of intermediate connecting tubes. The two connecting tubes and the socket unit are disposed at the lower surface of the main body. A plurality of threaded insertion holes are provided on the lower side of the main body, and the two connecting tubes may be inserted into and fixed by these holes. The threaded insertion holes are spaced apart. The rectangular holes allow the adjustment in the distance between the two connecting tubes (screws may be used to affix the two connecting tubes if necessary). The intermediate connecting tubes have several different diameters so that the intermediate connecting tubes may be connected with the bolts provided on the backrests of a seat for different models of automobiles. Hence, by adjusting the distance between the connecting tubes and selecting intermediate connecting tubes with a suitable diameter, the main body may be connected to the backrest of a seat for different models and makes of automobiles.

BRIEF DESCRIPTION OF THE DRAWINGS

The drawings disclose an illustrative embodiment of the present invention, which serves to exemplify the various advantages and objects hereof, and are as follows.

DETAILED DESCRIPTION OF THE PREFERRED EMBODIMENT

Figure 1:
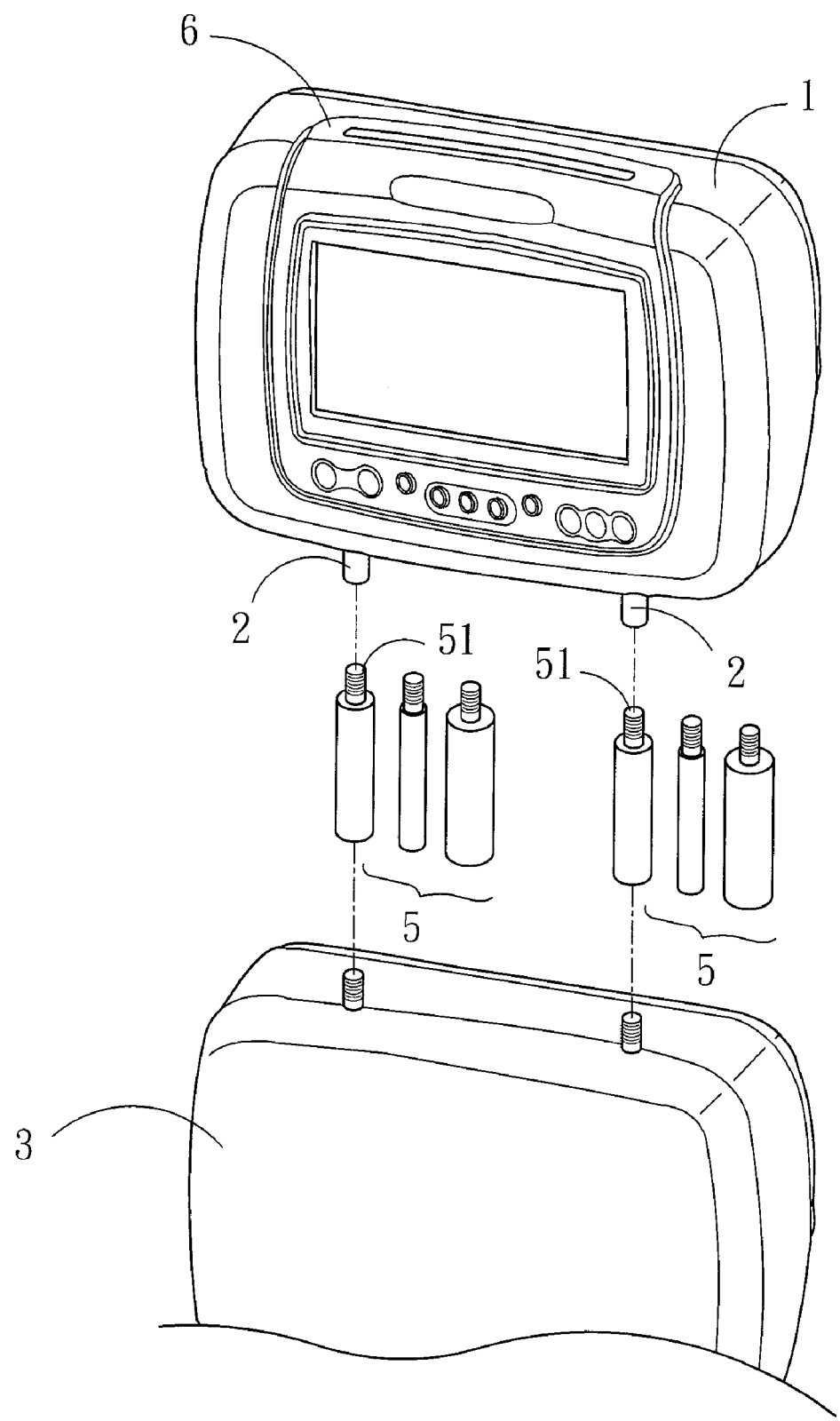
FIG. 1 is a perspective view of the improved headrest of the present invention.
Figure 2:
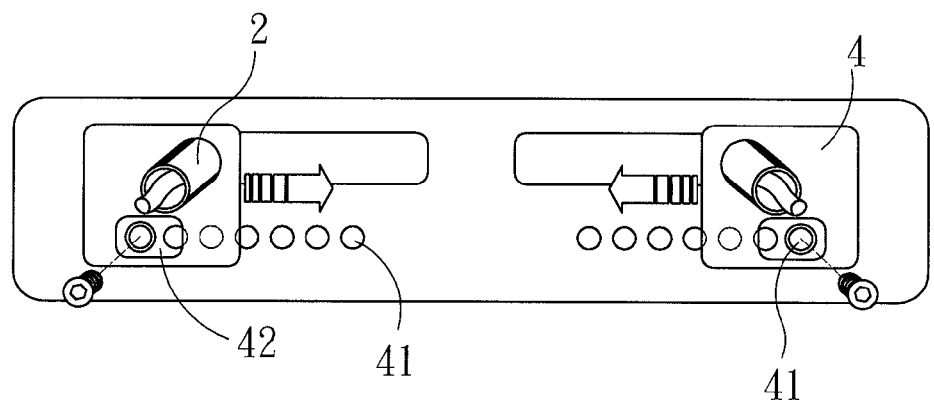
FIG. 2 is a bottom view of the improved headrest of the present invention, showing a socket unit disposed at the lower surface of the main body.

Please refer to FIGS. 1 and 2. The improved headrest of the present invention comprises a main body 1, two connecting tubes 2, a socket unit 4 and several pairs of intermediate connecting tubes 5. The two connecting tubes 2 and the socket unit 4 are disposed at the lower surface of the main body. The main body 1 is connected to the backrest 3 of a seat by the two connecting tubes 2. A plurality of threaded insertion holes 41 are provided on the lower side of the main body, and the two connecting tubes 2 may be inserted into these holes 41. The insertion holes 41 are spaced apart. The rectangular holes 42 allow the adjustment in the distance between the two connecting tubes 2 (screws may be used to affix the two connecting tubes 2 if necessary). An intermediate connecting tube 5 may be connected with each tube 2 via thread 51 or other means. The intermediate connecting tubes 5 may have several sizes of diameters so that the intermediate connecting tubes 5 may be connected with the bolts provided on the backrests of different models or makes of automobiles.

Hence, by adjusting the distance between the tubes 2 and selecting the intermediate connecting tubes 5 with a suitable diameter, the main body 1 may be connected to the backrest 3 of a seat. In one example, a tube 2 is fixed and the other tube 2 is moveable; in another example, both tubes 2 are moveable.

Figure 3:
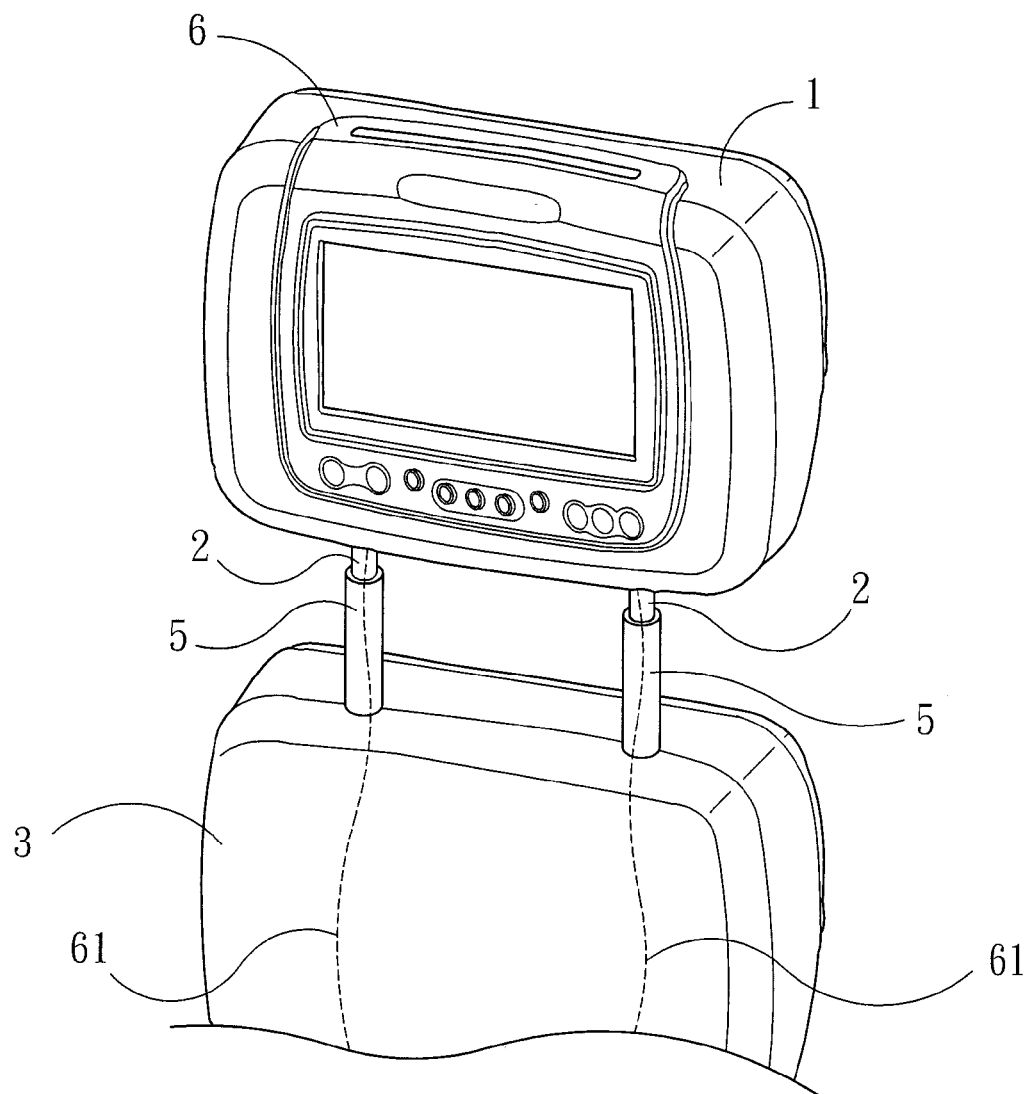
FIG. 3 is a perspective view of the improved headrest of the present invention, showing the electric wires of an electric device fitted and hidden in the connecting tubes and the intermediate connecting tubes.

Now, please refer to FIG. 3. An electric device 6 (such as a video device or an audio device) may be fitted in the main body 1. Because the tubes 2 and the intermediate connecting tubes are hollow, the electric wires 61 of the electric device 6 may be fitted and hidden in these tubes 2 and 5 so that no electric wires are lying around.

Although a preferred embodiment of the present invention has been described in detail in the above, the preferred embodiment and the associated discussion and drawings are intended to describe the objects and characteristics of the present invention and are to be regarded in an illustrative manner rather than a restrictive manner. It will, however, be evident that various changes and modifications may be made thereunto without departing from the broader spirit and scope of the invention.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An improved headrest with adjustable connecting tubes, comprising:
   a main body;
   two connecting tubes;
   a socket unit, including a plurality of spaced-apart threaded insertion holes so that at least a connecting tube is movable in the socket unit so as to adjust the distance between the two connecting tubes; and
   several pairs of intermediate connecting tubes, which are connectable with the connecting tubes to allow the main body to be fitted to a backrest of a seat of an automobile.

2. The improved headrest as in claim 1, wherein the socket unit has two rectangular holes so as to allow the adjustment in the distance between the two connecting tubes.

3. The improved headrest as in claim 1, wherein each intermediate connecting tube is connected with a corresponding connecting tube via thread.

4. The improved headrest as in claim 1, wherein the connecting tubes and the intermediate connecting tubes are hollow to allow electric wires of an electric device to be fitted and hidden in the connecting tubes and the intermediate connecting tubes.

* * * * *